United States Patent [19]

Aurness et al.

[11] Patent Number: 5,048,190
[45] Date of Patent: Sep. 17, 1991

[54] RECTANGULAR HOLE CUTTER

[76] Inventors: Harold O. Aurness, 5808 Knox Ave. No., Brooklyn Center, Minn. 55430; Sidney K. Legg, 3943 Lyndale Ave. No., Minneapolis, Minn. 55412

[21] Appl. No.: 170,904

[22] Filed: Mar. 21, 1988

[51] Int. Cl.$^5$ .................................................. B26B 3/00
[52] U.S. Cl. ........................................................ 30/299
[58] Field of Search ................... 30/299, 304, 360, 361, 30/362

[56] References Cited

U.S. PATENT DOCUMENTS

| | | | |
|---|---|---|---|
| 377,199 | 1/1888 | Hughes | 144/81 |
| 803,368 | 10/1905 | Smith | 144/81 |
| 1,971,701 | 8/1934 | Bills | 30/360 |
| 2,677,313 | 5/1954 | Biegert | 83/618 |
| 3,503,294 | 3/1970 | Vinciguerra et al. | 144/68 |
| 3,724,071 | 4/1973 | Hurtubise | 30/304 X |
| 4,180,908 | 1/1980 | Beermann | 30/299 X |
| 4,618,395 | 10/1986 | Breucha | 30/304 X |
| 4,730,395 | 3/1988 | Blessing, Sr. | 30/362 |

Primary Examiner—Timothy V. Eley
Assistant Examiner—Willmon Fridie, Jr.

[57] ABSTRACT

A rectangular hole cutter according to the teachings of the present embodiment of present invention is wholly shown as including a two-member cam device within a housing with a base plate, for vibrating one of three sets of alternate cutting blades to saw a rectangular hole in wall material. The cam is powered by an electric hand drill into which a stem from the male cam member has been inserted. The male cam swivels in a notch part of the female cam, which is centered on a base plate below the housing base plate, causing a vertical vibration in the unit as it is hand held against the area to be cut. The three blade sets, which are used for different materials, are generally of several blade members linked together rotatably and attached rotatably to a base plate which is secured to the bottom of the female cam member base plate. Vibration between the two base plates is governed by four spring constrained stabilizer posts anchored in the lower base plate and extending up slideably through the upper base plate. The vibration of the unit transmitted to the cutting blades causes a swivel, sawing action with help from drop arms from the cam housing base plate connecting the overlapping saw blades at a center point in each side which returns the blades rapidly to a starting point while vibrating.

8 Claims, 1 Drawing Sheet

U.S. Patent      Sep. 17, 1991      5,048,190
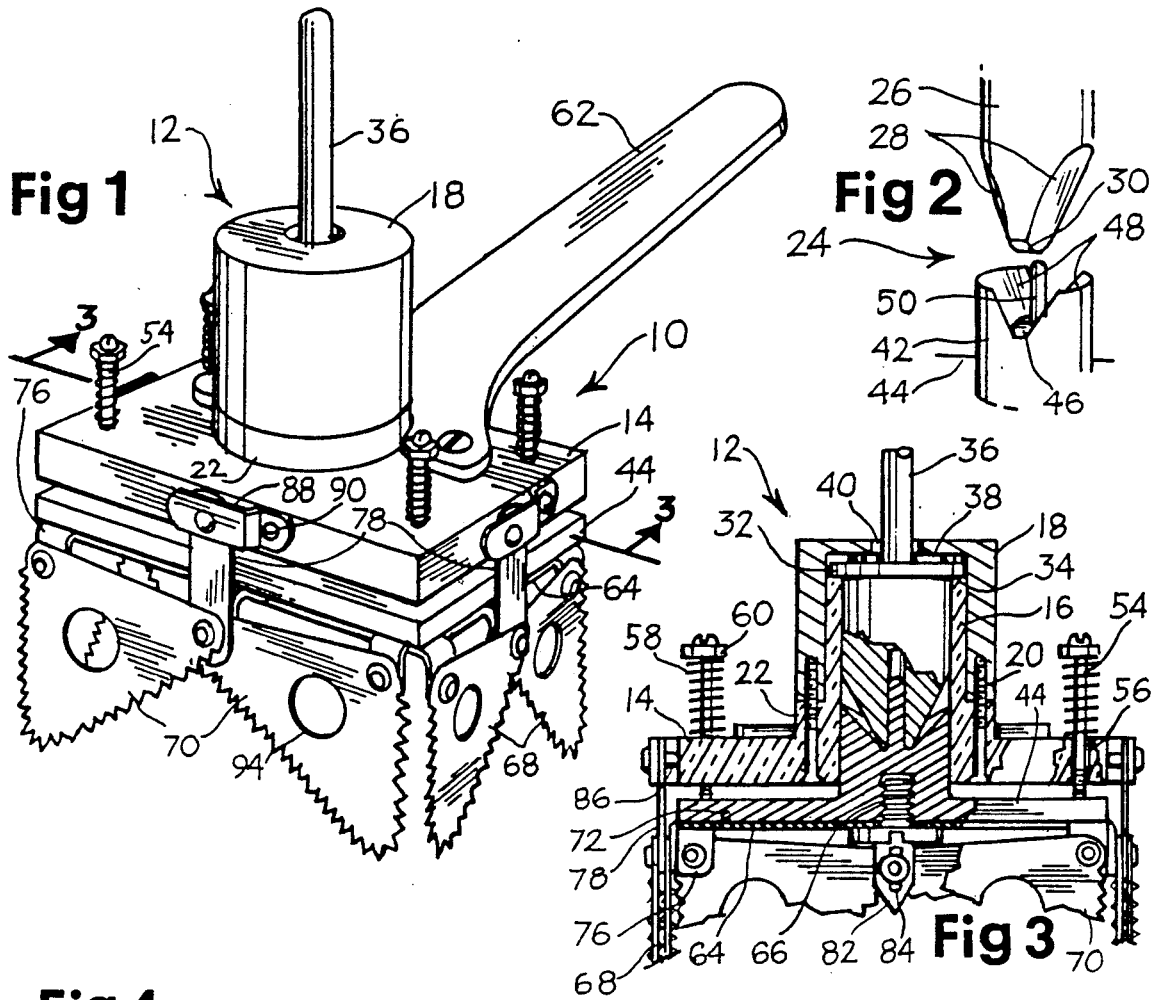
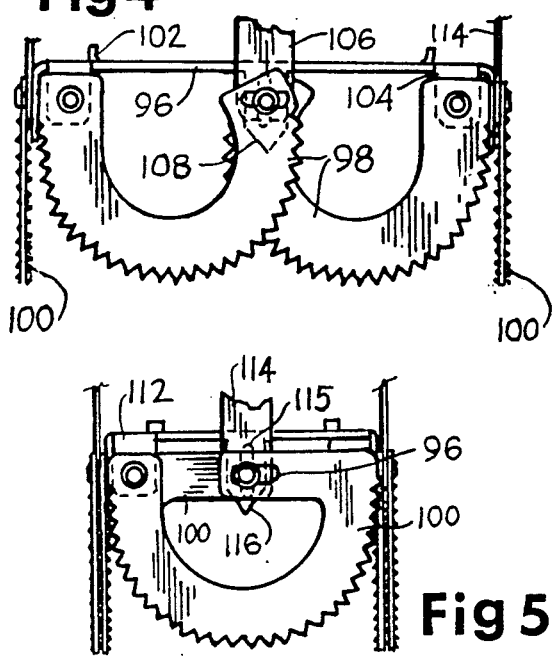

RECTANGULAR HOLE CUTTER

SUMMARY

The present invention relates generally to hole cutting devices.

With the increasing speed in building construction there is a need to also speed up the individual operations such as the electrical wiring.

The present invention fills this need by providing, in the preferred embodiment, an improved method for cutting openings in light wall material for outlet boxes.

Specifically, a two-part cam device is provided within a housing with a driving stem extending from the top, male, cam member for attaching to an electric drill. The male member of the cam is a partial cone shape cylinder and fits rotatably into a notch part of the female cylindrical cam member with a center post of the female cam member extending up into the male cam member.

The female cam member is centered on a rectangular base plate in spaced relation directly below the cam housing base plate, both plates being of the same perimeter dimensions. Stabilizer posts anchored in the four corners of the cam base plate extend up through holes in the cam housing base plate and hold the two base plates together in spaced relation with the help of spiral expansion springs surrounding each post. A lever type handle extends out from the top of the cam housing base plate.

The present invention further fills this need by providing in the present embodiment three cutting sets: cutting set A, cutting set B, and cutting set C.

Cutting set A consists of triangular cutting blades, two to a side, rotatably mounted on holding tabs extending down from a blade base plate which is secured to the bottom of the cam base plate by a single screw and four corner claws. Drop arms from the center of the sides of the cam housing base plate connect to the blades and a center holding tab and cause a sawing action by the vertical movement of the cam. The drop arms are detachable from the cam housing base plate for the purpose of changing to a different set of cutting blades. The drop arm form and function is identical on all three blade sets.

Cutting set B consists of semi-circular U-shaped cutting blades mounted on a rectangular base blade base plate. The long sides of the unit each have two symmetrical, overlapping cutting blades and the short sides have one blade each which have a slight variation in shape from the blades on the long side. The cutting blades on all sides swivally attached to holding tabs extending down from the base plate and also to a drop arm from the cam housing base plate which transmits the vertical vibration to the cutting blades resulting in a sawing action. The blade base plate is detachable from the unit by a single screw and the drop arms also are detachable by a single screw each.

Cutting set C consists of straight saw blade segments, two lengths per side, rotatably attached to each other and to holding tabs extending down from the blade base plate. They form acute angles at the bottom of the unit. The blade base plate is identical to the blade base plate of cutting set A and attaches by a single screw and corner claws to the bottom of the cam base plate. Drop arms from the cam housing base plate extend down to attach to the overlapping saw blades at the center of the sides and to holding tabs. The drop arms transmit vertical vibration to the cutting blades which cause a sawing action.

DESCRIPTION OF THE DRAWINGS

FIG. 1 shows a perspective view of a hole cutter unit with alternative cutting blade set A according to the teachings of the present invention.

FIG. 2 shows a perspective view of the cam device.

FIG. 3 shows a partial cross-sectional view of FIG. 1 according to section line 3—3.

FIG. 4 shows a frontal view of the long side of cutting blade set B.

FIG. 5 shows a frontal view of the short side of cutting blade set B.

FIG. 6 shows a frontal view of the long side of cutting blade set C.

Where used in the various figures of the drawings, the same numerals designate the same or similar part. When terms such as top, bottom, front or side, horizontal or vertical are used it must be understood they refer only to the structure shown in the drawings as they appear to a person viewing the drawings.

DESCRIPTION

A unit for cutting rectangular holes in light construction material is wholly shown in the drawings and generally designated 10. Unit 10 generally includes a cam housing generally designated 12 and consisting of a rectangular cam housing base plate 14 having a top side, a bottom side, and four perimeter sides with a housing cylinder 16, open at both ends, centered on the top side of the cam housing base plate 14, with a cylindrical housing cover 18 attached by screws 20 from the bottom side of the cam housing base plate 14 to a flange 22 around the base of the housing cylinder 16 on the top of the cam housing base plate 14.

Unit 10 further includes a two member cylindrical cam device generally designated 24 located in and conforming closely to the diameter of housing cylinder 16 and whose function is to impart a vertical vibrating movement to unit 10. The top, or male, member 26 of the cam device 24 has a bottom portion formed into partial cone shapes 28 on two opposite sides of the cam cylinder separated at the bottom by the space of a narrow, curved plane 30 bending approximately 20° up each opposite side. The opposite, or top end of the male cam member 26, is flanged 32 to rest on the top rim 34 of the housing cylinder 16. A stem 36 from the center of the top of the male cam member 24 extends up through a washer 38 and a hole 40 in the center of the top of the housing cover 18 and fits into any electric drill used to power the unit 10.

The female member 42 of the cam device 24 is centered on a rectangular cam base plate 44, having a top side and a bottom side and matching the perimeter dimensions of the cam housing base plate 14 and is positioned in spacial relation directly below the cam housing base plate 14. The female cam member 42, matching the diameter dimension of the male cam member 26, extends up into the cam housing 12 to meet the male cam member 26. The top portion of the female cam member 42 is formed as a wide horizontal notch across the diameter of the cylinder leaving a small, flat valley 46 between the slopes 48 which curve concavely outward. A small cylindrical post 50 from the center of the valley 44 extends up into a receiving hole 52 in the center of the curved plane 30 of male cam member 26 in which it slides.

Holding the two base plates 14 and 44 together in spaced relation are four adjustable stabilizer posts 54 extending up from and anchored in the cam base plate 44 slideably through corner holes 56 in cam housing base plate 14. Surrounding each stabilizer post 54 is a spiral expansion spring 58 for adjusting the base plates 14 and 44 to each other as the unit 10 vibrates. Washers 60 at the top of the stabilizer posts 54 capture the springs 58 between the washers 60 and the cam housing base plate 14. Screw heads on the stabilizer posts 54 allow for adjustment.

A lever type handle 62 extends outwardly from the top of the cam housing base plate 14.

Unit 10 also includes three alternate cutting set members: cutting set A, cutting set B and cutting set C.

Cutting set A consists of eight right angle triangular cutting blades mounted two to a side to a rectangular blade base plate 64 which attaches to the bottom side of cam base plate 44 by a single large-headed short screw 66 through the center of both plates which are of the same perimeter dimensions per short side and long side. Smaller cutting blades 68 attach to the short side and larger cutting blades 70 to the longer side of the blade base plate 64. Although the triangular cutting blades of cutting set A are smaller on the short side of the perimeter of the blade base plate 64, the cutting depth dimension is the same on all blades. Four short claws 72 symmetrically positioned near the corners of the blade base plate 64 extend into corner holes in the bottom of cam base plate 44 for stability. The cutting blades 68 and 70 are rotatably attached at their 90° corners by rivets 74 to short holding tabs 76 which bend at 90° angles from the plane of the blade base plate 64 at each corner of each side of the blade base plate 64.

At the center points of each side of the blade base plate 64 the oblique corners of the blades of cutting set A overlap a drop arm 78 extending from a center point of the perimeter of cam housing base plate 14 and to which they are rotatably attached by rivets 80. The rivets 80 also extend through short holding tabs 82 bending at 90° from the plane of the blade base plate 64 at the center of each side and are pointed so as not to impede the cutting action. The holes 84 in the holding tabs 82 are elongated to allow for swivel movement.

The four drop arms 78 which are flat, narrow bars, are rotatably attached to short pegs 86 behind small rectangular ears 88 offset from the perimeter sides of cam housing base plate 14. Each ear 88 is removeably attached to base plate 14 by a single screw 90 to allow the blade set to be changed. The four drop arms 78, acting as governors, return the overlapping blade corners at the center points on each side to their starting points during the vertical vibration movement. This is the typical function for the drop arms 78 on all three cutting sets. The action of the drop arms 78 helps cause a swivel action of the blades causing them to saw the material.

Saw blade type teeth 92 on only two sides of the triangle of the blades which contact the material to be cut do the cutting as the unit vibrates and is pushed by the operator using the handle 62 of the unit.

Large diameter holes 94 in each blade represent material removed to reduce friction.

Cutting set B includes six semi-circular blades mounted on a rectangular blade base plate 96 which attaches to the bottom side of cam base plate 44 by a large-headed short screw 66 through the center of both plates which are of the same perimeter dimensions per short side and long side. Although the cutting blades of cutting set B are approximately the same size to each other they are not quite the same shape.

The two symmetrical cutting blades 98 on each of the longer sides of the blade base plate 96 are of a U shape with a 180° circular bottom connecting the legs of the U, with one leg continuing the circle part way toward the other leg which is straight. The single blades 100 on each of the shorter side of the perimeter of the unit are also of a U shape with a 180° circular bottom connecting the legs of the U, with one leg bending 90° at the top toward the straight leg of the U. The width of the blades is constant in the U shape from leg to leg.

Four short claws 102 symmetrically placed near the corners of the blade base plate 96 extend into the corner holes in the bottom of cam base plate 44 for stability.

The cutting blades 98 on the two longer sides of the perimeter of unit 10 are rotatably attached at the top of their straight legs by rivets to short holding tabs 104 which bend at 90° angles from the plane of the blade base plate 96 at each corner of the long sides. The other, curved, leg of each of the blades 98 overlap, at their extremity, a drop arm 106 extending from a center point on each of the long sides of the perimeter of cam housing base plate 14 to which they are rotatably attached by rivets. The rivets also extend through short holding tabs 108 bending at 90° angles from the plane of the blade base plate 96 at the center point of the long side of the perimeter of unit 10 and are pointed so as not to impede the cutting action. The rivet holes 110 in the center holding tabs are elongated vertical to the plane of blade base plate 96 to allow for swivel movement.

The cutting blades 100 which span each of the shorter sides of the blade base plate 96 are also attached rotatably by rivets at the top of their straight legs to short holding tabs 112 which bend down 90° from the plane of the blade base plate 96 at one corner on each short side symmetrically opposite a corner on the other short side of the blade base plate 96. The end of the other leg of each of the cutting blades 100 attaches rotatably by a rivet to a drop arm 114 extending down from the center of each of the short sides of the perimeter of cam housing base plate 14. The rivets also extend through short holding tabs 116 which bend down 90° from the plane of the blade base plate 96 at the center point and are pointed so as not to impede the cutting action. The rivet holes 115 in the holding tabs 116 are elongated vertical to the plane of the blade base plate 96 and the rivet holes in the cutting blades 100 are elongated parallel to the plane of the blade base plate 96 to allow for swivel action.

Saw blade type teeth on the outside perimeter of the blades do the cutting as the unit vibrates and is pushed by the operator.

Cutting set C consists of sixteen straight saw blade segments, eight shorter blades 118 and eight longer blades 119 rotatably attached to each other and to a blade base plate 120 to form acute angles 122 at their extremities, two on each short and long side of the perimeter of the unit.

The blade base plate 120 attaches to the bottom of cam base plate 44 by a single large short screw 66 through the center of both base plates.

Blade base plate 120 is identical to blade base plate 64 of cutting set A including its holding tabs 74 and 82.

The cutting blades formed on each of the long sides of the unit consist of two longer saw blades 119 and two shorter saw blades 118 with the longer saw blades 119 attached rotatably to the corner holding tabs 122 of blade base plate 120. The shorter saw blades 118 attach rotatably to the center holding tabs 124 separated by the drop arm 126. The other end of each of the shorter saw blades 118 are attached rotatably to near the outer end of the longer saw blades 119 which are pointed.

The saw blade arrangement is the same on the narrower side of the perimeter of the unit except for the shorter blades which are even shorter to compensate for the smaller width of the narrower side.

We claim:

1. A unit utilizing an outside power source for cutting rectangular holes in light-weight construction material such as wallboard comprising a two-member cam action means within a housing with a rectangular first base plate which describes the size and shape of the holes to be cut, with the base plate having a top side and a bottom side; a rectangular second base plate with a top side and a bottom side and having the same perimeter dimensions as the first base plate with the top side centered in spaced relation symmetrically to the bottom side of the first base plate; a female member of the cam action means centered immoveably on the top of the second base plate; a male member of the cam action means centered rotatably in the housing of the first base plate with a stem extending from a top end to an outside power source; with the female member of the cam action means having a special top end configuration and slideably centered in a hole centered through the first base plate to engage the male cam member, also having a special end configuration, to cooperatively create a pumping action when the power source is engaged; stabilizing means from spring constrained stabilizer posts extending up from corners of the second base plate slideably through the first base plate to return the base plates to their original spaced relationship during the induced action of the male cam member; several alternate separately attachable cutting blade sets to saw same size rectangular holes in different kinds of material, each set having a rectangular (third) base plate of a configuration common to all cutting set base plates and attachable to the bottom of the second base plate immoveably thereto; with saw blades of a distinct shape and kind for each set of blades attached rotatably to each perimeter side of the third base plate, with a common means for connecting the center overlapping blade corners rotatably and slideable vertically from the third base plate to the first base plate to facilitate the sawing action of the blades; a handle for hand guidance of the unit.

2. The rectangular hole cutter unit of claim 1 wherein the two cylindrical cam members are axially centered tandemly in close tolerance within a cylindrical housing, with the male cam member having a top end and a bottom end and being rotatable within the housing, with the top end having a stem extending to an outside power source, with the bottom end having a semi-cone shape with a curved, blunted bottom and an axially centered hole extending up from the bottom; with a female cam member having a top end and a bottom end fixed immoveably on a vertically moveable base plate which is spring governed for keeping the two cam members in working relationship when the unit is powered; with the female cam member having a V shaped notch with semi-circular sides on its top end to accommodate the shape of the male cam member in a closed position, with a stabilizer post extending axially from the top of the female cam member into the axially placed hole in the male cam member; wherein as the male cam member rotates in the notch of the female cam member the action forces the female cam member alternately downward to be alternately returned by the spring action of the female cam member base plate.

3. The rectangular hole cutter of claim 1 wherein the stabilizing means for returning the base plates to an alternate closed position while in operation comprises four corner posts anchored in the female cam member base plate extending slideably through the corners of the cam housing base plate and axially through spiral compression springs constrained by caps at the top of the posts, which springs are trapped between the caps and the top of the cam housing base plate.

4. The rectangular hole cutter of claim 1 wherein the common base plate member of the alternate cutting blade sets is attachable to the bottom of the female cam member base plate by a single fastening means with added cooperational means between the plates to inhibit rotation.

5. The hole cutter of claim 1 wherein the cutting means is improved by alternate cutting blade sets, with one cutting blade set comprising eight triangular, right angle sawblades attached two to a side to form a plane on each side 90° to the plane of the blade base plate which is attachable to the bottom of the female cam base plate; with the right angle corners of each blade connected rotatably to corner tabs of the blade base plate and with another corner overlapping a corner of a cutting blade symmetrically opposite at a side center point and connected rotatably together by a single means also to a blade base plate tab with an elongated hole and a connecting arm from the side of the cam housing base plate, wherein the connecting means allows a swivel, sawing action of the cutting blades.

6. The hole cutter of claim 1 wherein the cutting means is improved by alternate cutting blade sets, with one cutting blade set comprising semi-circular U-shaped blades attached two to a side on opposite sides and one each on two other opposite sides forming a 90° plane to the plane of the base plate, with the two sides with double blades having ends overlapping at a side center point and connected rotatably by a single means through elongated holes to an arm from the cam housing base plate and to a tab of the blade base plate with an elongated connecting hole; with a cutting blade on each of the two other opposite sides symmetrically and rotatably attached to one corner on each side at a top end and extending in a U-shape to the top of the other end of the side and bending back horizontally to connect to a tab of the base plate at the center of the side through elongated holes in the blade and the tab and also connecting by the same connecting means to an arm from the cam housing base plate; wherein the connecting means allows a swivel, sawing action of the cutting blades.

7. The hole cutter of claim 1 wherein the cutting means is improved by alternate cutting blade sets, with one cutting blade set comprising straight saw blade segments rotatably connected together to form acute angles at the bottom on each end of each side of the unit, and attached rotatably at the corners of each end of the unit to tabs of the blade base plate and rotatably to center tabs of the blade base plate on each side of the unit, with the center tabs having elongated holes for the connecting means, and also connected by the same means to arms from the cam housing base plate; wherein the connecting means allows a swivel, sawing action of the cutting blades.

8. The rectangular hole cutter of claim 1 wherein the handle means comprises a handle extending outward from the top of the cam housing base plate.

* * * * *